(12) United States Patent
Olive

(10) Patent No.: US 12,705,017 B2
(45) Date of Patent: Aug. 11, 2026

(54) SYSTEMS AND METHODS FOR SOUND QUALITY ENHANCEMENT WITH PERSONALIZED SOUND EQUALIZER CONTROLS

(71) Applicant: Harman International Industries, Incorporated, Stamford, CT (US)

(72) Inventor: Sean Edward Olive, Oak Park, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 203 days.

(21) Appl. No.: 18/781,908

(22) Filed: Jul. 23, 2024

(65) Prior Publication Data

US 2026/0029985 A1 Jan. 29, 2026

(51) Int. Cl.

| | |
|---|---|
| ***G06F 3/16*** | (2006.01) |
| ***H04R 1/10*** | (2006.01) |
| ***H04R 3/04*** | (2006.01) |

(52) U.S. Cl.

CPC ........... *G06F 3/165* (2013.01); *H04R 1/1041* (2013.01); *H04R 3/04* (2013.01); *H04R 2430/01* (2013.01)

(58) Field of Classification Search

CPC ........ H03G 5/165; H03G 5/025; H03G 5/005; H03G 7/002; H03G 3/3005; H03G 9/005; H03G 3/20; H03G 9/025; H03G 9/18; H03G 3/002; H04R 2430/01; H04R 3/04; G06F 3/165

See application file for complete search history.

(56) References Cited

U.S. PATENT DOCUMENTS

| | | | |
|---|---|---|---|
| RE48,462 | E | 3/2021 | Sabin et al. |
| 2014/0173519 | A1 | 6/2014 | Sassi |
| 2021/0195328 | A1 | 6/2021 | Welti et al. |
| 2022/0199103 | A1 | 6/2022 | Carter et al. |
| 2023/0403511 | A1 | 12/2023 | Pye et al. |

OTHER PUBLICATIONS

Olive, Welti, Khonsaripour, "Segmentation of Listeners Based on Their Preferred Headphone Sound Quality Profiles," Mar. 2019, AES 146 Convention.

Olive, S., "The Perception and Measurement of Headphone Sound Quality: What do Listeners Prefer," Acoustics Today, Spring 2002, vol. 18, No. 1.

Olive, S., Welti, T., "Factors that Influence Listeners' Bass Level Preferences in Headphones," 139 Oct. 2015.

(Continued)

*Primary Examiner* — Kile O Blair

(74) *Attorney, Agent, or Firm* — Burris Law, PLLC

(57) ABSTRACT

A computer-implemented method includes calculating percentile values for normalized gains in each of a plurality of equalizer bands, wherein the normalized gains are based on statistical norms for a distribution of gain values for each band of the plurality of equalizer bands. The computer-implemented method further includes receiving a user input adjusting a gain value for at least one band of the plurality of equalizer bands, wherein the user input is received from a graphical user interface showing adjustment values as the percentile values. The computer implemented method also includes adjusting an audio output of an audio playback device based on the received user input and causing the audio playback device to play the adjusted audio output.

20 Claims, 13 Drawing Sheets

(56) References Cited

OTHER PUBLICATIONS

Olive, S; Welti, T; Khonsaripour, O., "The Preferred Low Frequency Response of In-ear Headphones," AES 16th International Conference on Headphone Technology, Aug. 2016.

Miller, Tom; Downey, Cristina," A Wideband Target Response Curve for Insert Earphones," AES 153 Convention, Oct. 2022.

Bezzola, Andri, "In-Ear Headphones on Ear Canal Simulator vs Real Human Ear Geometries: Quantifying the Differences with Simulations," 123; AES Convention 155; Oct. 2023.

Møller, Henrik; Jensen, Clemen Boje; Hammershøi, Dorte; Sørensen, Michael Friis, "Design Criteria for Headphones" AES, Apr. 1995, vol. 43 Issue 4 pp. 218-232.

Extended European Search Report issued in corresponding EP Application 25189590.0, issued Nov. 25, 2025, 10 pages.

Sabin, et al., A Method for Rapid Personalization of Audio Equalization Parameters, pp. 769-772, 2009, Beijing, China.

300
302
Treble
Bass
MID/EAR
CANAL REGION
SPI
15.00
20.0k

400
Mids
402
95%
75%
50%
25%
5%

| Control | Type | Frequency | Q-factor | Gain |
|---|---|---|---|---|
| Bass Control | Low Shelf | 105 Hz | 0.7 | ± 12dB |
| Mid Control | Peak/Dip | 3 kHz | 0.8 | ± 6dB |
| Treble Control | High Self | 8 kHz | 0.7 | ± 12dB |

| Bass | | | Midrange | | | Treble | | |
|---|---|---|---|---|---|---|---|---|
| Values (dB) | Percentile | % Value (dB) | Values (dB) | Percentile | Percentile Value (dB) | % Values (dB) | Percentile | Percentile Value (dB) |
| -6 | 1 | -5.88 | -3 | 1 | -2.94 | -6 | 1 | -5.88 |
| -5 | 10 | -4.8 | -2 | 10 | -2.4 | -5 | 10 | -4.8 |
| -4 | 20 | -3.6 | -1 | 20 | -1.8 | -4 | 20 | -3.6 |
| -3 | 30 | -2.8 | 0 | 30 | -1.2 | -3 | 30 | -2.8 |
| -2 | 40 | -1.4 | 1 | 40 | -0.6 | -2 | 40 | -1.4 |
| -1 | 50 | 0 | 2 | 50 | 0 | -1 | 50 | 0 |
| 0 | 60 | 1.4 | 3 | 60 | 0.6 | 0 | 60 | 1.4 |
| 1 | 70 | 2.8 | | 70 | 1.2 | 1 | 70 | 2.8 |
| 2 | 80 | 4.2 | | 80 | 1.8 | 2 | 80 | 4.2 |
| 3 | 90 | 5.6 | | 90 | 2.4 | 3 | 90 | 5.6 |
| 4 | 99 | 5.88 | | 99 | 2.94 | 4 | 99 | 5.88 |
| 5 | | | | | | 5 | | |
| 6 | | | | | | 6 | | |

| Bass | | Midrange | | Treble | |
|---|---|---|---|---|---|
| Normalized Value | Calculated Percentile | Normalized Value | Calculated Percentile | Normalized Value | Calculated Percentile |
| -3 | 0.285 | 0 | 0.5 | -2 | 0.333 |

SYSTEMS AND METHODS FOR SOUND QUALITY ENHANCEMENT WITH PERSONALIZED SOUND EQUALIZER CONTROLS

FIELD

The present disclosure relates to sound reproduction, and more particularly, to systems and methods for sound quality enhancements with personalized sound equalizer controls.

BACKGROUND

The statements in this section merely provide background information related to the present disclosure and may not constitute prior art.

Personalization of sound to improve an individual user's listening experience, such as for headphones, is often provided using equalization tools. However, these equalization tools can be complicated or difficult to understand in use, resulting in a less than preferred sound and user experience. For example, multi-band graphic and parametric equalizers often require expert knowledge to use effectively. As such, most users are unable to properly adjust equalizer settings to achieve a desired or improved sound quality or listening experience.

SUMMARY

This section provides a general summary of the disclosure and is not a comprehensive disclosure of its full scope or all of its features.

The present disclosure provides a computer-implemented method comprising: calculating percentile values for normalized gains in each of a plurality of equalizer bands, wherein the normalized gains are based on statistical norms for a distribution of gain values for each band of the plurality of equalizer bands; receiving a user input adjusting a gain value for at least one band of the plurality of equalizer bands, wherein the user input is received from a graphical user interface showing adjustment values as the percentile values; adjusting an audio output of an audio playback device based on the received user input; and causing the audio playback device to play the adjusted audio output. The computer-implemented method wherein the plurality of equalizer bands comprises a bass band, a midrange band, and a treble band, and further comprising determining normalized levels for the bass band, the midrange band, and the treble band by calculating an average level in a frequency response error curve for each of the bass band, the midrange band, and the treble band and having a corresponding filter; wherein the audio playback device comprises headphones and further comprising calculating a difference or error in a frequency response between two headphones to generate the frequency response error curve; wherein the graphical user interface comprises a virtual control corresponding to each of the bass band, the midrange band, and the treble band, wherein the virtual control is configured to allow adjustment of the gain values that are displayed as the percentile values; wherein the virtual control comprises three virtual rotary controls or three virtual sliding members corresponding to each of the bass band, the midrange band, and the treble band, wherein the virtual control is color coded with different colors to denote where the gain falls within the distribution of statistical norms.

The computer-implemented method further comprises storing personalization data for a user to a database, wherein the personalization data defines a personal sound profile for the user and comprises gain settings, a headphone model, a frequency response, a program, a playback SPL, a demographic/hearing profile, or a combination thereof; further comprising automatically personalizing the gain value for plurality of equalizer bands based on a model generated by machine learning and configured to predict the personal sound profile for the user based on a personality profile, a demographic profile, a hearing profile, or a combination thereof; further comprising calculating and classifying the personal sound profile according to a class and a percentile corresponding to the adjusted gain received from the user; and further comprising calculating values for the normalized gains in each band of the plurality of equalizer bands as percentiles relative to a reference frequency response curve.

The computer-implemented method further comprises wherein the audio playback device comprises headphones and calculating the percentile values for normalized gains in each of a plurality of equalizer bands comprises normalizing a frequency response of the headphones using a reference frequency response and determining mean values for each band of the plurality of equalizer bands using the normalized frequency response; wherein receiving the user input adjusting the gain value for at least one band of the plurality of equalizer bands comprises receiving one or more adjustments corresponding to a standard test track; further comprising displaying via the graphical user interface a normalized gain value for each band of the plurality of equalizer bands before receiving the user input; and wherein the statistical norms are updated based on preferred settings for a plurality of listeners.

The present disclosure provides a system comprising an audio playback device; a graphical user interface; a processor; and a non-transitory computer-readable storage medium storing instructions which, when executed by the processor, cause the processor to calculate percentile values for normalized gains in each of a plurality of equalizer bands, wherein the normalized gains are based on statistical norms for a distribution of gain values for each band of the plurality of equalizer bands; receive a user input adjusting a gain value for at least one band of the plurality of equalizer bands, wherein the user input is received from the graphical user interface showing adjustment values as the percentile values; adjust an audio output of the audio playback device based on the received user input; and cause the audio playback device to play the adjusted audio output. The system further comprises wherein the audio playback device comprises headphones and the plurality of equalizer bands comprises a bass band, a midrange band, and a treble band, and the instructions further cause the processor to determine normalized levels for the bass band, the midrange band, and the treble band by calculating an average level in a frequency response error curve for each of the bass band, the midrange band, and the treble band and having a corresponding filter, and calculate a difference or error in a frequency response between the headphones and another set of headphones to generate the frequency response error curve; and wherein the graphical user interface comprises a virtual control corresponding to each of the bass band, the midrange band, and the treble band, wherein the virtual control is configured to allow adjustment of the gain values that are displayed as the percentile values, wherein the virtual control comprises three virtual rotary controls or three virtual sliding members corresponding to each of the bass band, the midrange band, and the treble band, and wherein the virtual control is color coded with different colors to denote where the gain falls within the distribution of statistical norms.

The system also comprises wherein the instructions further cause the processor to store personalization data for a user to a database, wherein the personalization data defines a personal sound profile for the user and comprises gain settings, a headphone model, a frequency response, a program, a playback SPL, a demographic/hearing profile, or a combination thereof, and wherein the personal sound profile is calculated and classified according to a class and a percentile corresponding to the adjusted gain received from the user; wherein the audio playback device comprises headphones and the instructions further cause the processor to calculate the percentile values for normalized gains in each of a plurality of equalizer bands normalizing a frequency response of the headphones using a reference frequency response and determine mean values for each band of the plurality of equalizer bands using the normalized frequency response; and wherein the graphical user interface is configured to display a normalized gain value for each band of the plurality of equalizer bands before receiving the user input.

The present disclosure provides one or more non-transitory computer-readable media storing processor-executable instructions that, when executed by at least one processor, cause the at least one processor to: calculate percentile values for normalized gains in each of a plurality of equalizer bands, wherein the normalized gains are based on statistical norms for a distribution of gain values for each band of the plurality of equalizer bands; receive a user input adjusting a gain value for at least one band of the plurality of equalizer bands, wherein the user input is received from a graphical user interface showing adjustment values as the percentile values; adjust an audio output of an audio playback device based on the received user input; and cause the audio playback device to play the adjusted audio output.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
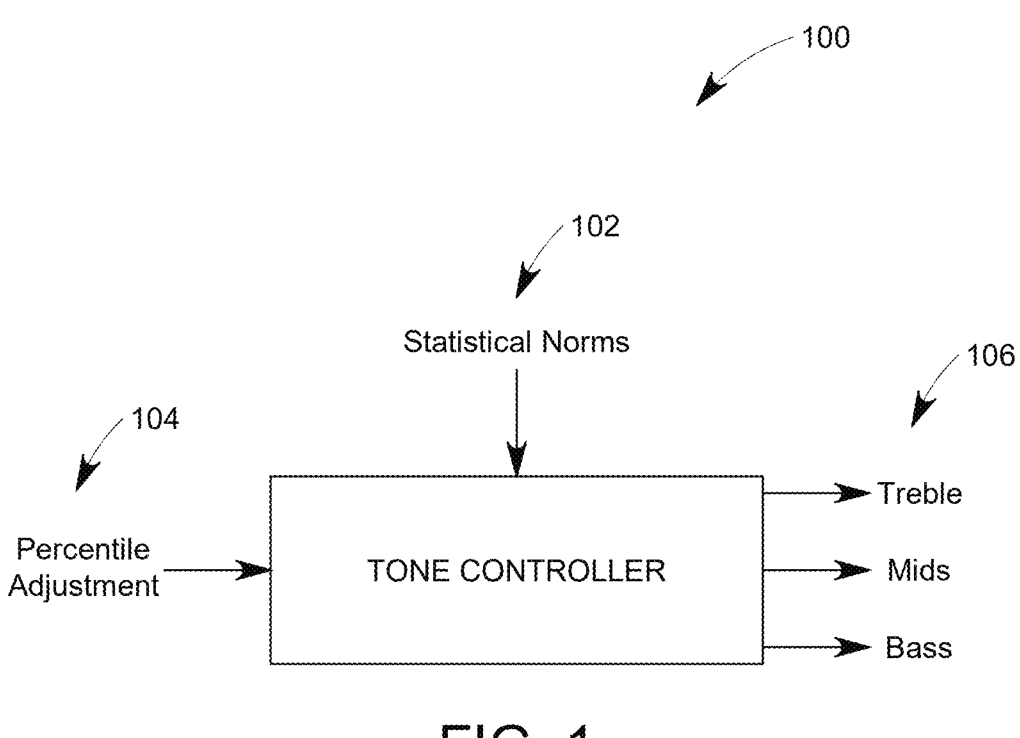
FIG. 1 is a block diagram illustrating a tone controller in accordance with one or more embodiments.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more implementations of the present disclosure provide systems and methods for sound enhancement and/or personalization. In some examples, a headphone is equalized to accommodate individual preferences in frequency response (FR), commonly referred to as sound personalization. The personalization process in one or more implementations is simplified by using three fixed filters that address the three frequency regions where most variances in preference occur: the bass, the midrange, and the treble regions.

In one or more examples, personalization is achieved by adjusting the gain (dB) of each band with values expressed as a percentile (1 to 100) based on statistical norms established in a controlled study. For example, the study measures a large sample of listeners representative of different segments of the population (e.g., age, gender, listening experience, hearing loss, etc.) where bass/midrange/treble levels are adjusted based on preference. The data from this study provides a distribution of responses from which the median, quartiles and percentiles of preferred gain values are known. Further cluster analysis can identify different classes or segments of listeners based on similarities in their sound profile preference and the underlying demographic factors that may predict the sound profile preference. As such, one or more implementations allow for a customized set of statistical norms based on that segment for a listener when there is a demographic profile match.

In one or more implementations, a simplified user interface is provided with only three adjustments that focus on the three most common frequency regions as described in more detail herein, resulting in a faster and improved user experience. The user interface in one or more examples provides adjustments in percentiles rather than decibels (which may not be as meaningful for most listeners) resulting in increased context and meaning to the settings. In one or more examples, feedback also indicates to the user when adjustments fall far outside the norm, thereby providing a warning that responses are possible outliers from errors that need further examination.

Referring to FIG. 1, a tone controller 100 is shown in accordance with one or more implementations of the present disclosure. The tone controller 100 allows for sound personalization as described in more detail herein. For example, the tone controller 100 is configured to provide sound equalization based on statistical norms 102 to personalize the sound output of, for example, a headphone. That is, in one or more implementations, the tone controller 100 uses statistical norms 102 to allow adjustments of tone settings corresponding to different segments of listeners that may have listening "tastes" that vary from the average listener.

The tone controller 100 is configured to receive as an input, one or more percentile adjustments 104 that is easier or more intuitive to a user in adjusting different tone properties corresponding to audio output settings 106, which in one or more implementations includes treble, midrange (mids), and bass frequency settings. In the illustrated example, the output control is simplified to include only these three frequency settings (e.g., filter bands), namely setting values within the treble frequency range (e.g., above 4 kilohertz (kHz), the middle frequency range (e.g., 300 Hz to 4 kHz), and the bass frequency range (e.g., 20 Hz and 300 Hz). However, it should be appreciated that other frequency settings and ranges are contemplated. Thus, the tone controller 100 in one or more implementations is configured to receive user adjustments in percentiles or standard deviations instead of decibels (which a user may not understand what is meant in subjective or sound quality terms).

Figure 2:
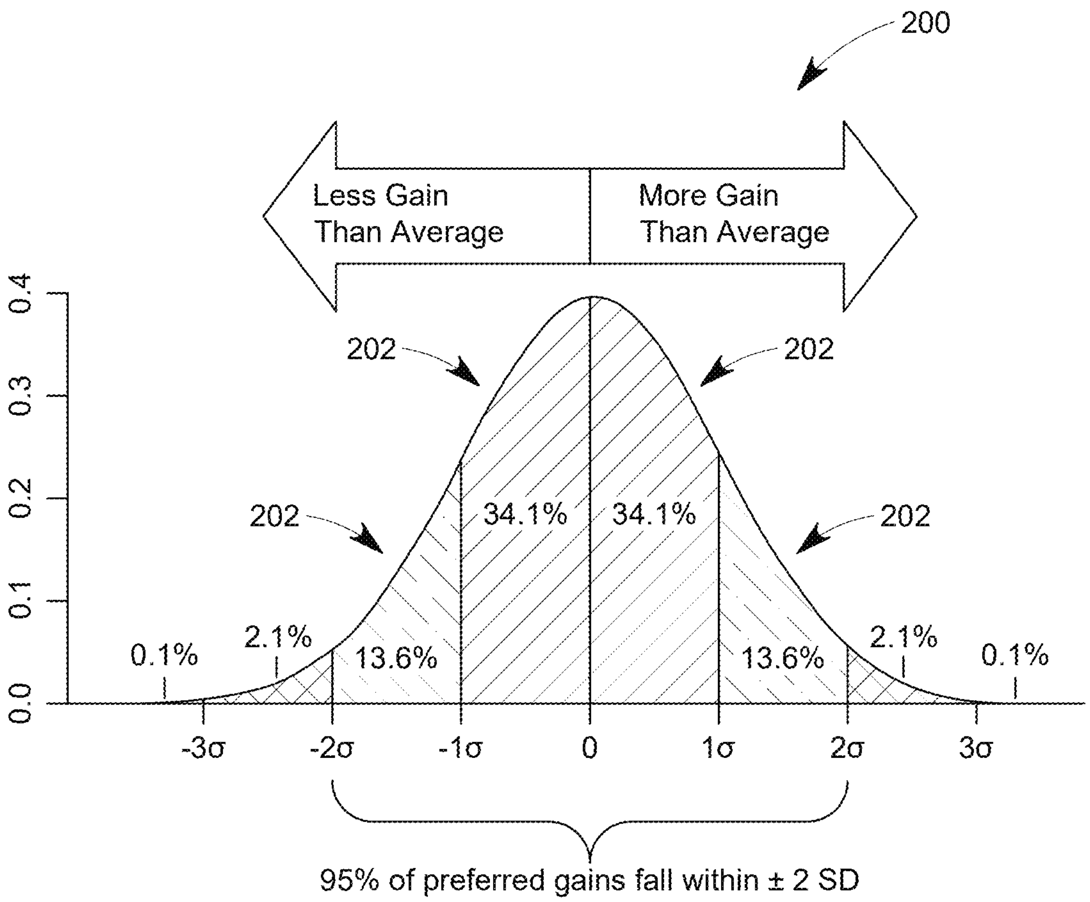
FIG. 2 is a graph illustrating normalized gain distribution in accordance with one or more embodiments.

In one or more examples, the tone controller 100 is configured to provide gain adjustments based on the statistical norms 102 as illustrated in the graph 200 shown in FIG. 2. That is, the adjustable settings for treble, midrange, and bass frequencies in one or more implementations is defined by percentile or standard deviation ranges 202 as shown by the graph 200. In the illustrated example, preferred gains fall within two standard deviations (+/−2 SD) of an average gain setting. As such, the gain of equalizer (EQ) filters (e.g., in audio headphones) in some examples is controlled by the audio output settings 106 from the tone controller 100 based on percentile adjustments 104. A more intuitive approach is thereby provided in one or more examples that expresses the user's gain adjustments in percentiles or standard deviations based on prior knowledge of where the user's adjustments fall in the distribution of a large sample of listeners who have made gain adjustments in a controlled study for each of the three filter bands.

Figure 5:
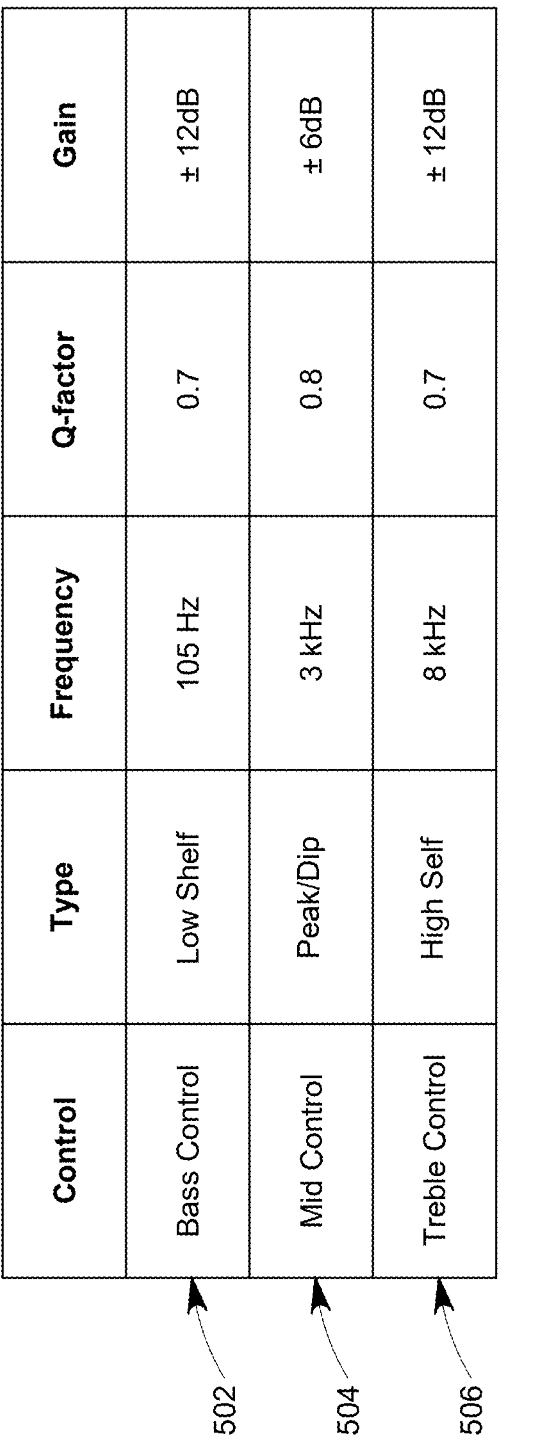
FIG. 5 is a table illustrating filter band parameters in accordance with one or more embodiments.

In one or more examples, the tone controller 100 allows for implementation of a simplified sound equalizer. For example, as shown in the graphs 300 and 400 of FIGS. 3 and 4, a simple three-band equalizer is configured to control three dominant frequency regions 302 corresponding to bands that address three "important" frequency ranges that require adjustment. The tone controller 100 in one or more implementations is configured to allow only gain adjustment with the values defined and/or shown based on the statistical norms 102 illustrated as percentile value curves 402 that define filter band parameters. For example, a table 500 shown in FIG. 5 illustrates parameters corresponding to bass control 502, midrange control 504, and treble control 506 using the statistical norms 102. The control properties or parameters can be defined based on, for example, type, frequency, Q-factor, and gain. However, other properties or parameters may be used.

Figure 6:
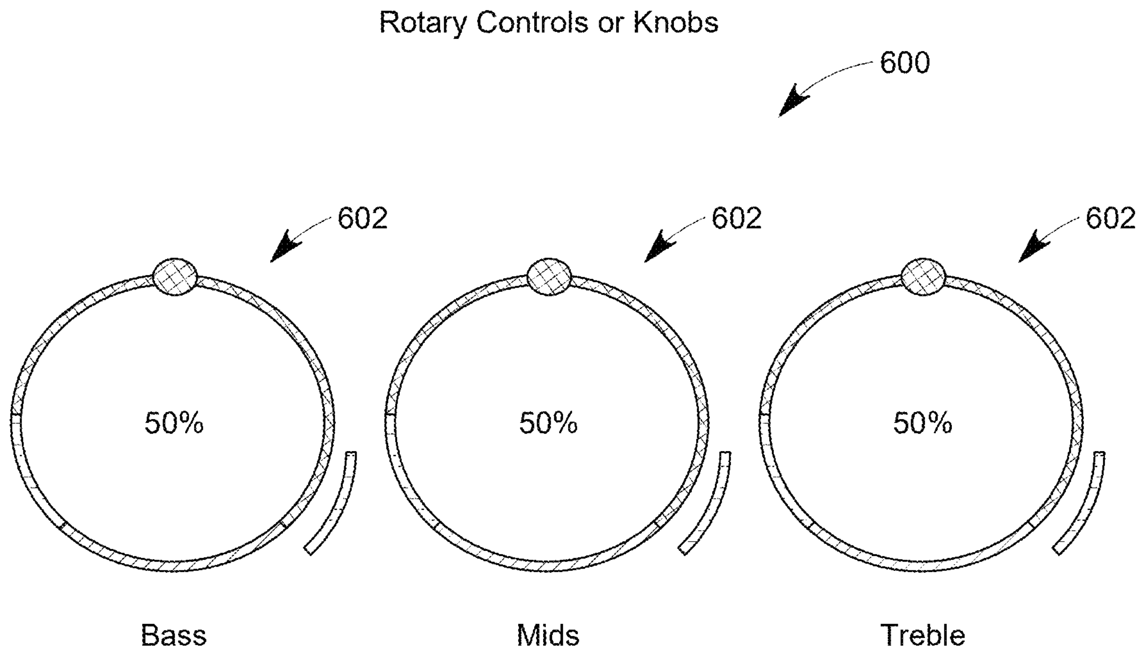
FIG. 6 is a diagram illustrating a user interface in accordance with one or more embodiments.
Figure 7:
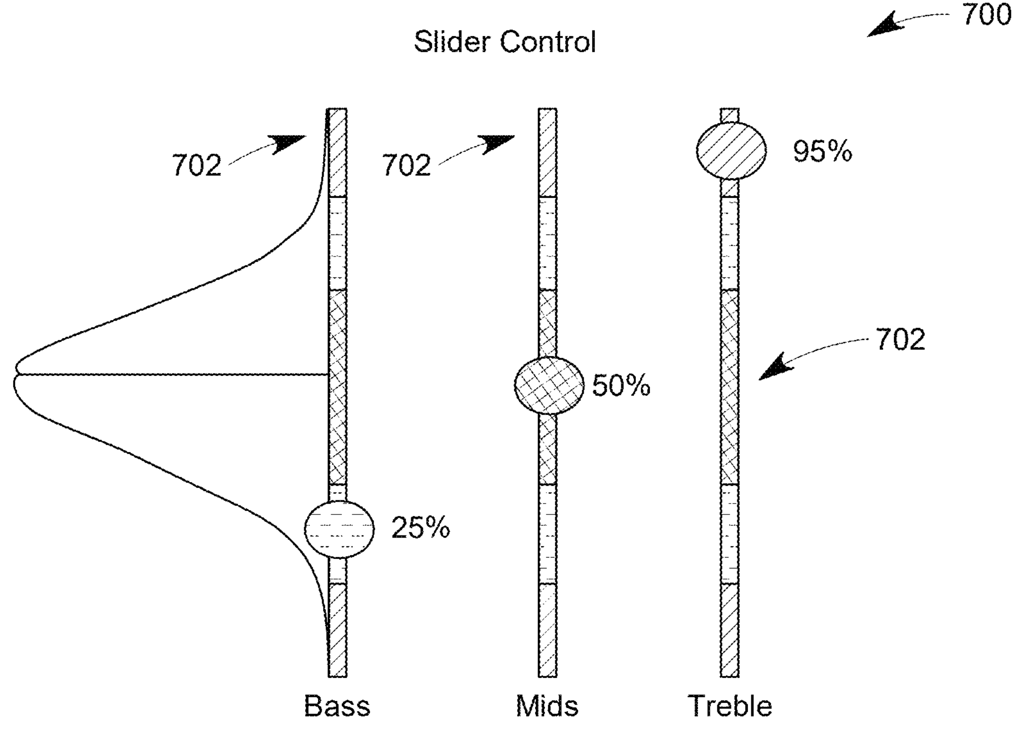
FIG. 7 is a diagram illustrating another user interface in accordance with one or more embodiments.
Figure 8:
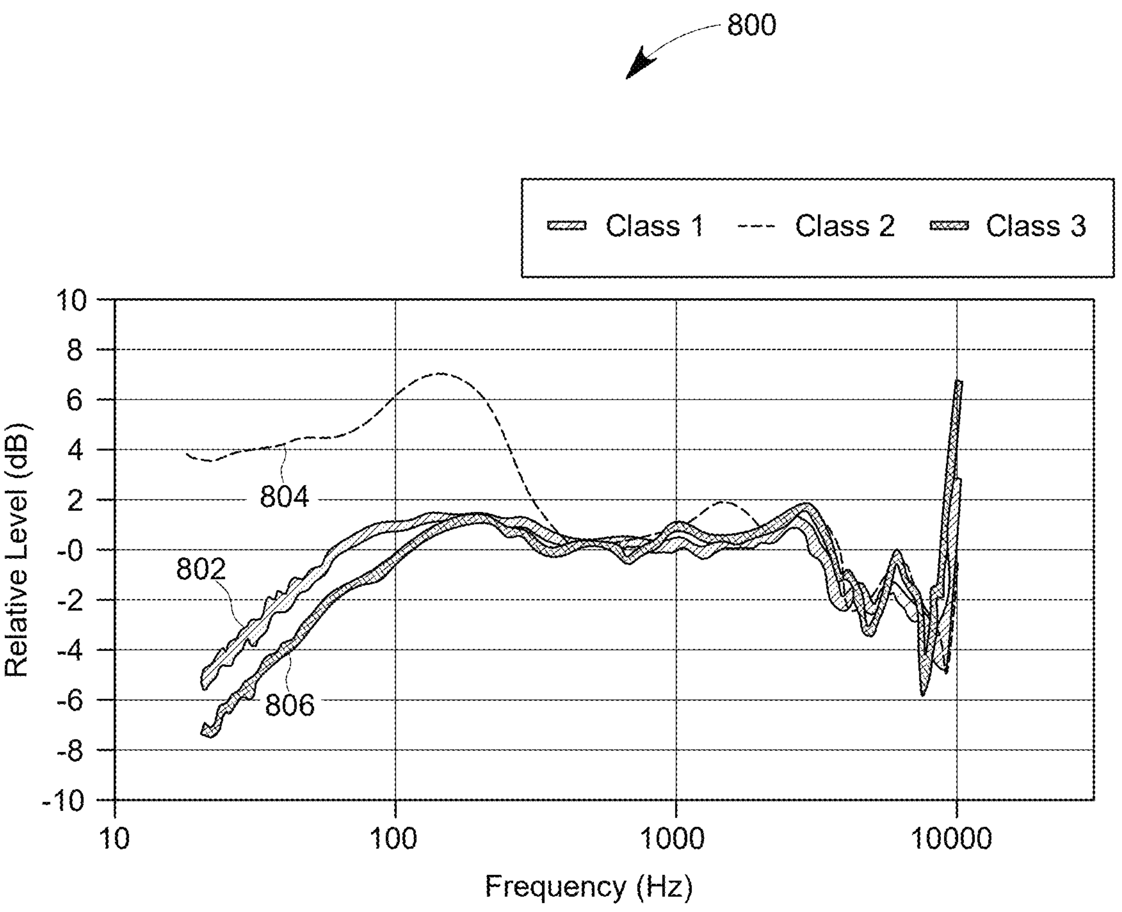
FIG. 8 is a graph illustrating sound profiles in accordance with one or more embodiments.

In one or more examples, user interfaces 600 and 700 as shown in FIGS. 6 and 7 are provided and correspond to the filter band parameters. As can be seen, the user interfaces 600 and 700 are configured to receive adjustment settings or changes based on percentiles. That is, gain adjustments are expressed in percentiles instead of decibels. For example, the user interface 600 includes three rotary controls 602 (e.g., virtual rotary knobs or dials) corresponding to the bass control 502, midrange control 504, and treble control 506. The user interface 700 include three slider controls 702 (e.g., virtual sliding members or elements) corresponding to the bass control 502, midrange control 504, and treble control 506. As such, gain adjustments are defined and controlled based on percentiles in an easier to control and more intuitive arrangement. It should be appreciated that other non-decibel setting controls can be used, such as defined based on standard deviations as described in more detail herein.

In operation, one or more implementations allow for equalizing, for example, a headphone to accommodate individual preferences in its FR, thereby providing improved sound personalization. For example, simplified user interfaces 600, 700 with only three adjustments that focus on the three frequency regions provide a faster, and improved user experience. In one or more examples, the listeners are segmented based on headphone preference, such as, but not limited to, at least three different segments of listeners based on preferred headphone FR: (1) listeners preference ratings for different headphones models most listeners (64%) preferred a headphone having an FR closely complied with a headphone manufacturer Target FR; (2) a segment (21%) preferred a headphone with more bass and treble than the manufacturer Target FR; and (3) a smallest segment (15%) prefers more bass and treble than the manufacturer Target FR. Thus, in one or more implementations listeners can be segmented based on headphone preferences, such as into three different segments.

For example, the graph 800 illustrates plots 802, 804, 806 corresponding to the average FR of the top five preferred headphones in a group of thirty headphones, which have been normalized to the response of target (e.g., a Harman Target) for each listening class/segment. As can be seen, most of the differences among segments in taste (e.g., sound listening preference) are related to relative bass and treble levels, and to a less extent midrange. As such, in one or more implementations, individual tastes can be accommodated by using two to three fixed filters focused on the bass, midrange, and treble with adjustment to the gain as described in more detail herein.

In one or more example, headphone preference segments or classes are predicted based on listener's experience, age, gender, hearing loss, or a combination thereof. It should be appreciated that inclusion in one of the three classes described above can be predicted based on the listener's demographic profile (e.g. age, gender, etc.), as well as listening experience and hearing loss. Using these factors, in one or more implementations, a model is generated using these factors, which can be utilized to automatically personalize the headphone class of the listener, such as described in U.S. Patent Application Publication No. 2021/0195328. However other sound enhancements and personalization may be used.

As some examples of sound preferences, it was found that the effect of age-related hearing loss on the preferred high FR of an in-ear headphone showed that listeners preferred high frequency above 6 kHz with increased hearing loss. Noise-induced hearing loss tends to produce a sharp dip in the audiogram at 3-4 kHz, which is a frequency region where sensitivity is greatest from a natural resonance produced by ear canal and concha. As such, an EQ filter centered at on this region may help compensate for noise induced hearing loss.

Additionally, ear canal and head/ear/torso variations can also affect or influence personalization. For example, it was found that individual listener's preferred upper midrange (e.g. 2 kHz-6 kHz) level may vary due to anthropometric differences in the shape and geometry of their ear canals and pinna that cause up to 10 dB differences when measured at the ear drum or at the entrance of the open canal. These features are known to affect perceived sound quality (timbre) as well as spatial dimensions such as externalization and localization. Thus, most individual preferences related to headphone FR fall into three segments, and these are accommodated in one or more implementations using three equalization filters: bass, midrange (ear canal region) and treble as described in more detail herein instead of multi-band graphic equalizers or parametric equalizers that are complex and difficult to use without expert knowledge; or instead of having the listener complete a series of trials where incremental changes are made to the EQ and based on the listeners' responses the settings are adjusted until the settings converge on a solution, which users may not have the patience to perform to personalize their headphones.

In one or more implementations, all three frequency regions are addressed that allows the listener to make direct adjustments without the need for completing a series of test trials, thus increasingly the likelihood the feature is used. The direct approach combined with the gain adjustments reduced to three fixed filters results in a personalization method that is faster and more intuitive. For example, converting the gain adjustments from dB to percentiles gives the user more context with respect to where the user's preferred adjustments relate to other listeners' tastes. In one or more examples, the adjustment controller (such as shown in FIGS. 6 and 7) displays the percentile and a color coding to indicate, for example, typical gain values (green: 40-60 percentile), less common values (e.g., yellow: 20-40 and 60-80 percentiles) and extreme values (e.g., red: 0-20 and 80-100). It should be noted that extreme gain values beyond 1 and 99 percentiles warn the listener that the adjustments are possible outliers, and the user may want to reconsider the setting.

In one or more implementations, the selection of music tracks used for the control study contain full bandwidth spectral content and are well-balanced or neutral, with no apparent emphasis/strength or weakness in any frequency regions. The ideal tracks can be found, for example, through auditioning by experts and spectral analysis and then used in the control study and later shared during the personalization process. Also, the sensitivity of human hearing is nonlinear in both level and frequency dependence, meaning the perceived loudness and timbre of sounds changes depending on the sound pressure level (SPL) of the playback level. This psychoacoustic phenomenon is known as loudness contours and describes the exact level adjustments required for pure tones at different frequencies and SPLs to sound equally loud. In one or more examples, the overall playback level used in the control study and the personalization process are calibrated accordingly. For example, the levels are selected to be close to one another and at a comfortable, typical level (e.g. 78-80 dB (B-weighted)). It should be noted that the playback SPL of the headphone can be established if the music track, sensitivity, and volume setting of the headphone are known. Headphones that have feedback microphones used for acoustic pressure level (ANC) purposes can be used to measure the SPL inside the ear.

It should also be noted that the FR of the headphone used for personalization in one or more examples is selected to ideally match the FR of the reference headphone used in the controlled study since this is the underlying assumption when using statistical norms in the personalization process. In one or more implementations, the headphone is designed to match the FR of a reference headphone (e.g. HARMAN Target Curve) used in the control. Then, the consumer tailors the bass/midrange/treble of the headphone to meet personalized needs. In one or more other examples, the headphone is equalized with an onboard DSP before personalization so the FR of the headphone matches that of the reference headphone. The FR of the headphone can be measured during production and stored in the headphone or personalization application to enable this feature. Alternatively, data from one or more databases where measurements for hundreds of headphone models are stored can be downloaded. In one or more other examples, the headphone is calibrated so the differences in FR are known and accounted for during the personalization process. If the FRs of both the reference headphone and the consumer headphone are known, a calibration is performed to calculate the relative levels in each EQ band which are used during the personalization process.

Figures 3, 4:
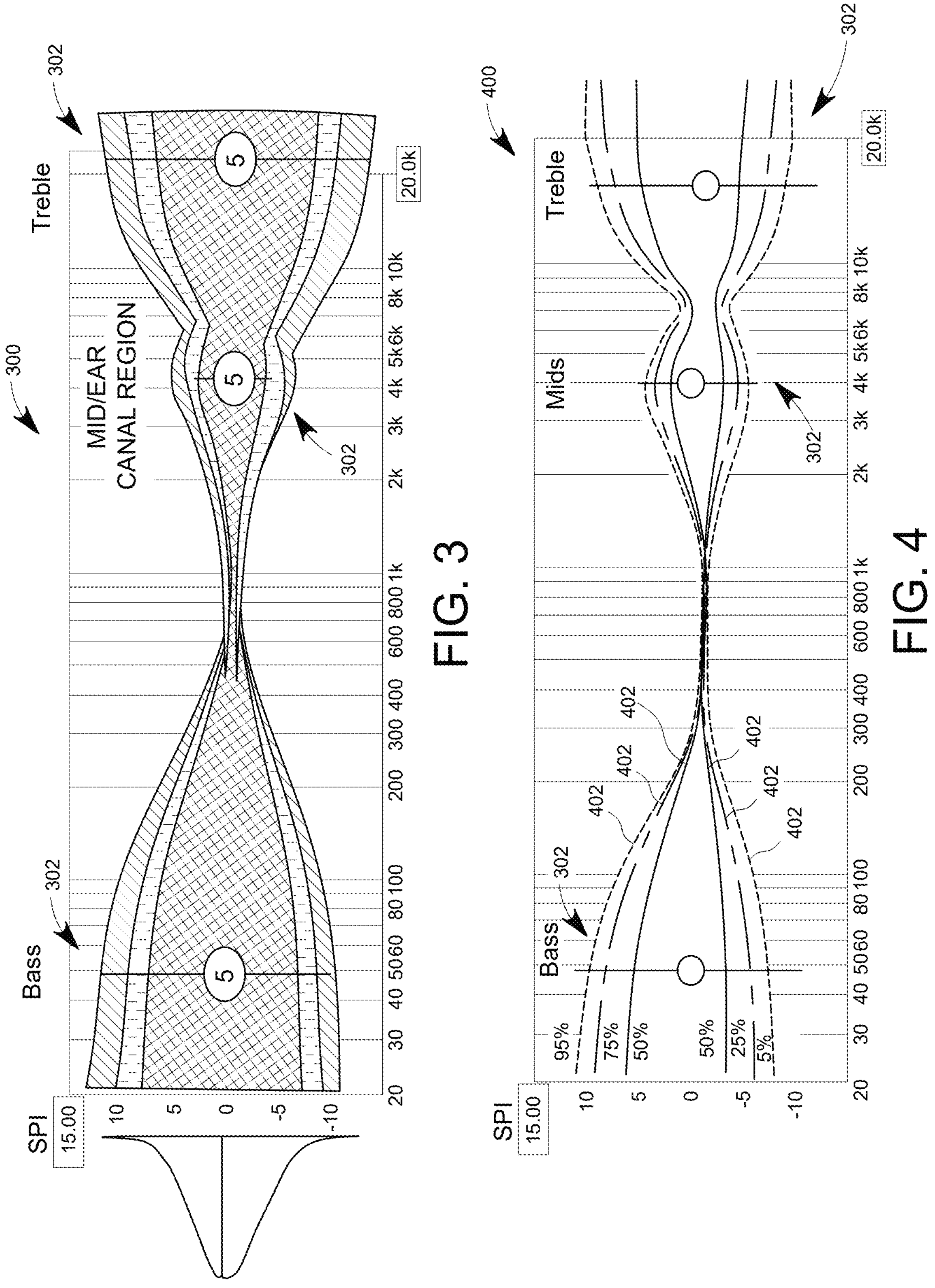
FIG. 3 is a graph illustrating different equalizer bands in accordance with one or more embodiments.
FIG. 4 is a graph illustrating filter band parameters in accordance with one or more embodiments.
Figure 9:
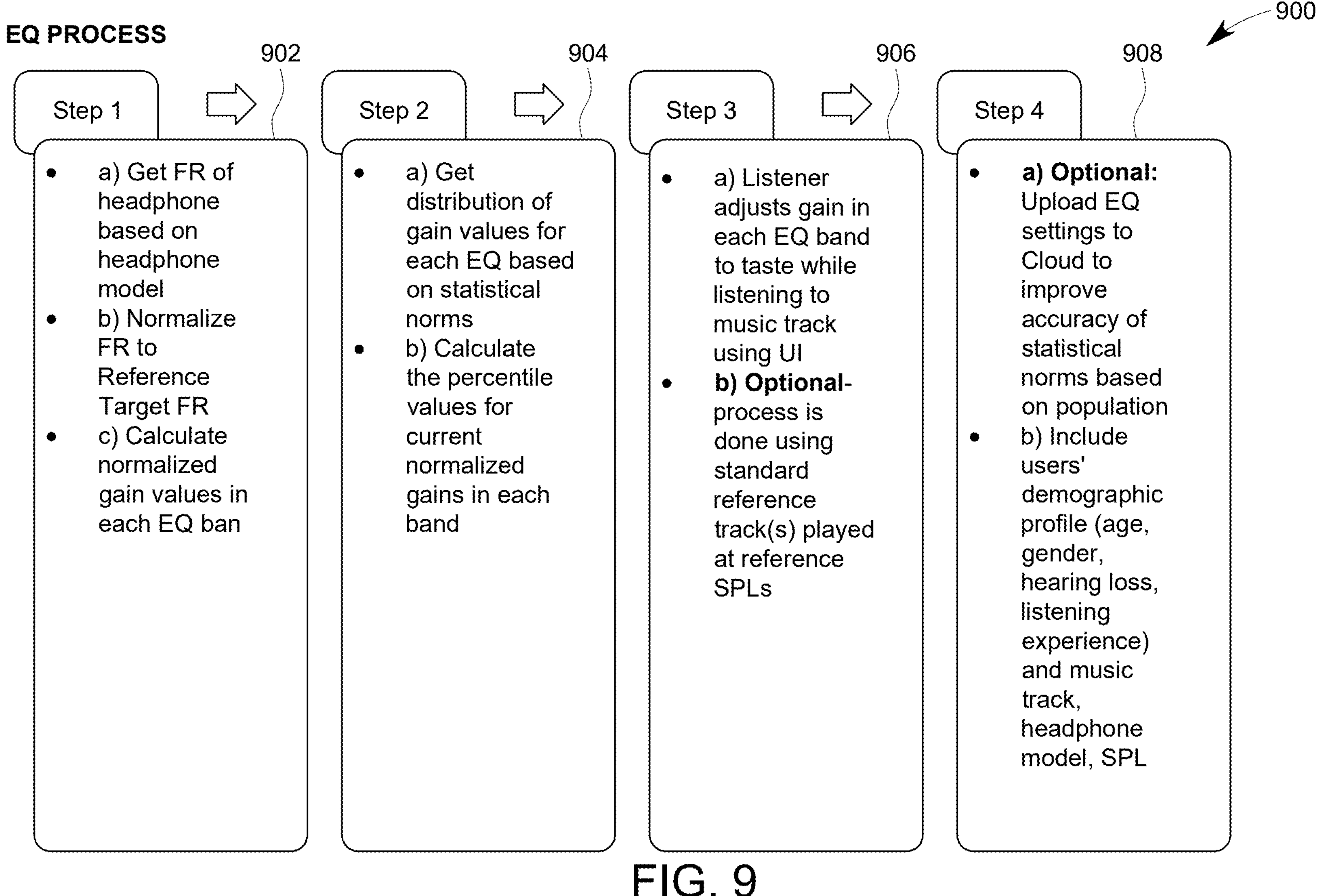
FIG. 9 is a flow diagram illustrating an equalizer process in accordance with one or more embodiments.

FIG. 9 is a block diagram of performing an EQ process 900 according to one or more embodiments. The EQ process 900 can be implemented using, for example, an application on a computing device (e.g., smart phone, tablet, embedded in audio device/controller, case) that includes an audio DSP processor on the device or the headphone itself that performs the processing used in the personalization process. In one or more examples, the application includes a graphical user interface (GUI) on the application (or a screen on the charging case) for the user to adjust and provide feedback. In one or more examples, the user can use voice commands to a voice assistant agent (e.g. bass: 75%, midrange: 50%, Treble: 50%) to make adjustments. As another example, the user may also say "increase bass" and the voice agent feedback gives the current level in the percentile (e.g. "current bass level is at the 75 percentiles"). It should be noted that in one or more examples, communication from the application to the headphone and the cloud/internet to access data (e.g., music, headphone FR data, latest data on statistical norms), is provided via Bluetooth and WiFi or other wireless (or wired) communication link. As described in more detail herein, the filters used for the personalization process are shown in FIGS. 3 and 4 and examples of the GUI are shown in FIGS. 6 and 7 illustrating rotary knobs or sliders that display key information, such as: the current gain value as a percentile, a color-coding denoting increasing values from the media and optionally where the value falls within a normal distribution of preferred values.

Figure 10:
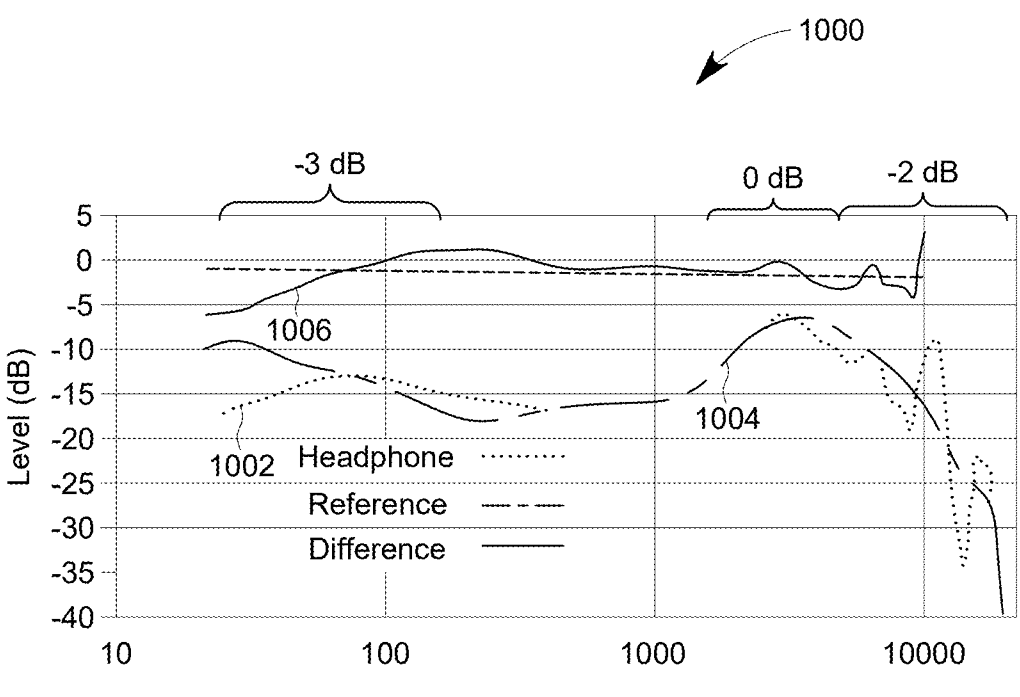
FIG. 10 is a graph illustrating frequency responses in accordance with one or more embodiments.

With particular reference now to FIG. 9 and the EQ process, at 902 an FR of a target headphone is determined. For example, the FR of the target headphone is obtained to calibrate and normalize the headphone's response to a known reference FR (e.g. HARMAN Target Curve) from which the statistical norms of preferred levels are based. For example, as shown in the graph 1000 of FIG. 10, the FR of the headphone represented by a curve 1002 is normalized with a reference FR represented by a curve 1004 by subtracting the two curves 1002, 1004 to obtain a curve 1006 (e.g., a difference or error curve). The mean values can then be calculated in each of the bands.

The FR of the target headphone can be stored, for example, in the hardware of the headphone or a software application, such as during manufacture, downloaded from the manufacturer, or retrieved from a public database of headphones measurements. That is, the target headphone is normalized to a reference target FR. For example, the current bass, midrange, and treble levels of the target headphone are determined and normalized to the reference. Thus, in one or more examples, the target headphone FR is divided by the FR of the target, which represents the difference or error curve 1006. The levels in each band of the target are then determined. For example, the normalized bass, midrange and treble levels of the target headphone are determined by calculating the average level in the error curve within the bands of the three filters. It should be appreciated that larger deviations from 0 dB produce larger values.

Figure 11:
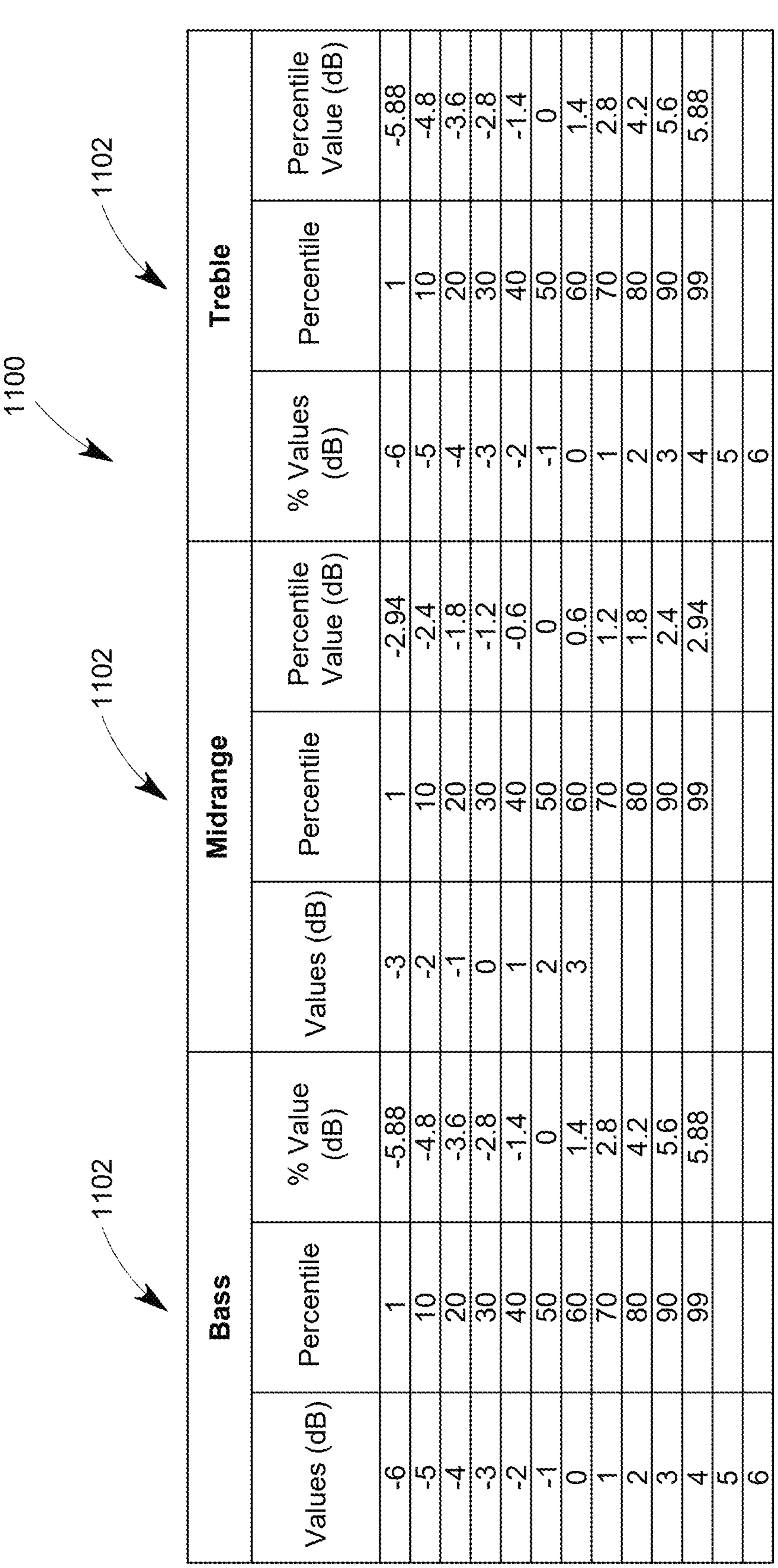
FIG. 11 is a table illustrating a distribution of gain values in accordance with one or more embodiments.

Statistical norms of gains are determined at 904. For example, as illustrated in a table 1100 of FIG. 11, a distribution of gain values for each EQ 1102 (e.g., bass, midrange and treble) based on statistical norms is obtained that include dB values, corresponding percentiles, and percentage values of dB. It should be noted that this operation uses prior knowledge of the distribution of gain values based on studies where listeners adjusted three bands under controlled test conditions. In one or more examples, a controlled study using the three specified filters described herein is conducted using a large sample of listeners that include, for example, a range of age, listening experience, gender, and hearing loss. The percentile values for current normalized gains in each band are calculated. For example, the gain values for each filter can be calculated as percentiles using standard statistical analysis applied to the dataset from the controlled study. The mean/median gain values of the sample represent the 50th percentiles, ±1 standard deviation (SD) from the mean represents the 16th and 84th percentile, +2 SD are the 2.5 and 97.5 percentiles, and +3 SD represent the 0.3 and 99.7 percentiles. It should be noted that any percentile in between these deviations can be estimated and applied to the user's adjustment during the personalization process.

At 904, the headphones are calibrated based on the FR. In this calibration, the differences between the FR of the headphone used in the control study and the personalization process are considered. For example, if the FRs do not match, then the differences are accounted for, such as to equalize the headphone to the same FR of the headphone used in the control study (e.g. The HARMAN Target) and then allow the user to personalize the FR to their desired listening. In one or more examples, without the matching being performed, the difference or error in FR between the two headphones represented as an FR error curve 1006 (see FIG. 10) is first calculated. From the curve 1006, the average error level in each filter band is calculated. For example, if there is no error (0 dB), the percentile value for each band would be 50% before adjustment is made. Positive errors in gain produce percentiles higher than 50% and negative errors in gain produce percentiles lower than 50%.

Figure 12:
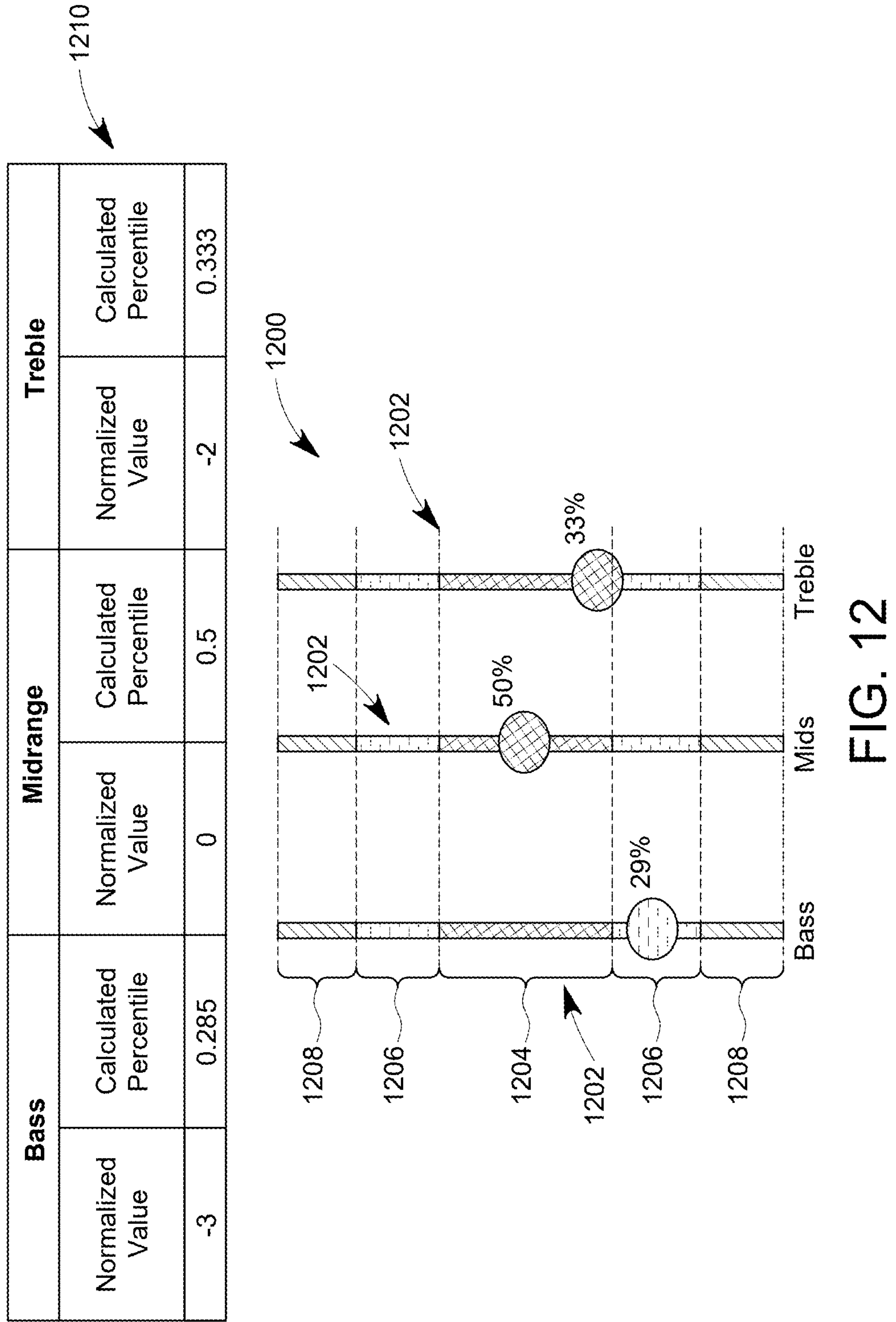
FIG. 12 is a diagram illustrating a user interface with normalized percentile values in accordance with one or more embodiments.

At 906, the listener adjusts the gain in each EQ band as desired, for example, while listening to a music track and using a UI 1200, such as shown in FIG. 12. For example, the listener adjusts the gain in each filter band based on taste. In one or more implementations, the user can make adjustments with a GUI (see FIGS. 6 and 7) where a rotary knob (e.g., the rotary control 602) or a slider (e.g., slider control 702) is used to increase/decrease the level in each band. The adjustment is shown as a percentile with different colors to denote where the gain falls within the distribution of statistical norms to provide the user context, meaning and guidance related to how the user's adjustments relate to other listeners as described in more detail herein. As can be seen in FIG. 12, the user can adjust the three bands with three separate controls 1202 (corresponding to a headphone EQ) and adjustments are expressed in terms or percentiles. That is, the normalized values in each band relative to the reference curve 1004 (See FIG. 10) are calculated as percentile as can be seen in the table 1210 (e.g., the bass, midrange, and treble gain values are 29%, 50%, and 33%). In one or more examples, the scale of each of the controls 1202 is colored coded (e.g. green/yellow/red) as gain adjustments deviate further from the median value (50%). In the illustrated example, the section 1204 represents the 33 to 67 percentiles and the sections 1206, 1208 are the upper and lower two sextiles. In one or more implementations, color coding makes the user aware of how typical the user's adjustments are relative to other listeners and reduces the likelihood of or avoids the user using values that are outliers.

It should be noted, as described herein, the user has the option of making adjustments using standard test tracks. For example, in one or more examples, the user uses standardized music test tracks that were used in the control study to eliminate the nuisance variables program and the playback level, which is also adjusted to match the level used in the control study. It should be noted that without control of the nuisance variables, the statistical norms used to determine the user's gain in percentiles can be less accurate. In one or more example, the user optionally performs this process using one or more standard reference tracks played at the reference SPLs.

Figure 13:
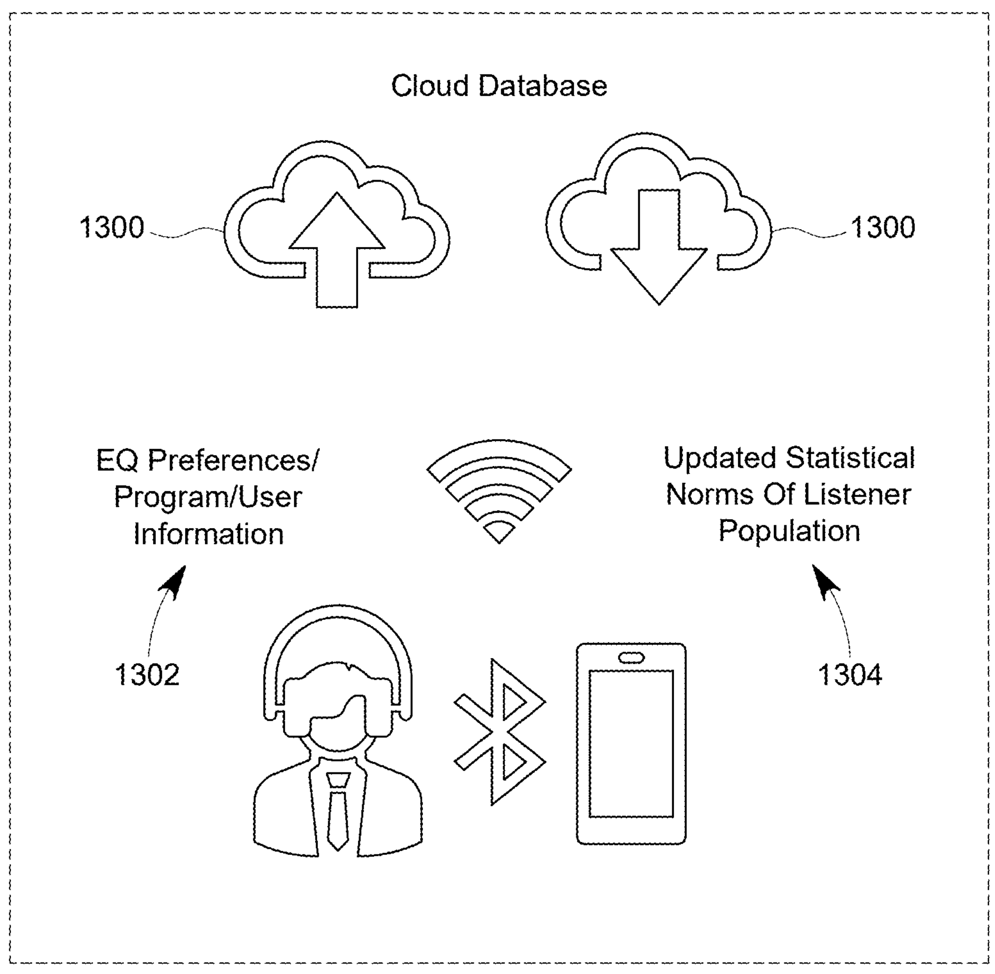
FIG. 13 is a block diagram illustrating a database arrangement in accordance with one or more embodiments.

At 908, EQ settings are optionally stored, such as uploaded to a storage device (e.g., databases 1300 in cloud storage as shown in FIG. 13) to improve the accuracy of statistical norms based on population. For example, the user's demographic profile (e.g., age, gender, hearing loss, listening experience, etc.) and other information 1302, such as the music track(s), headphone model, SPL, etc. are also stored (e.g., uploaded to the databases 1300). For example, the user's personalization data (e.g., gain settings, headphone model, FR, program, playback SPL, demographic/hearing profile) are uploaded to the databases 1300 in the Cloud (and can be shared with other audio devices of the user) for further analysis along with other users' data in one or more examples, which then provides updated statistical norms of the listener population 1304. In the aggregate, the user's personalization data provides insight into the relationship between personalization profiles, the music and playback levels and the user's demographic/hearing profile in one or more examples.

It should be noted that a larger data set along with machine learning and/or artificial intelligence (AI) is used in one or more examples to produce models that predict the user's personalization profile based on the user's personality/demographic/hearing profile and automatically personalizes the headphone without user intervention. By including headphone, program and playback SPL in the analysis, compensations for one or more of these factors can be automatically adjusted. For example, if the bias effect of a program and playback level on a user's personalization profile are determined through analysis, the bias can be accounted for in further analysis and models. Also, with an accurate predictive model, an EQ compensation can be automatically applied for a specific program and playback SPL to match the user's personalization profile in one or more examples.

Figure 14:
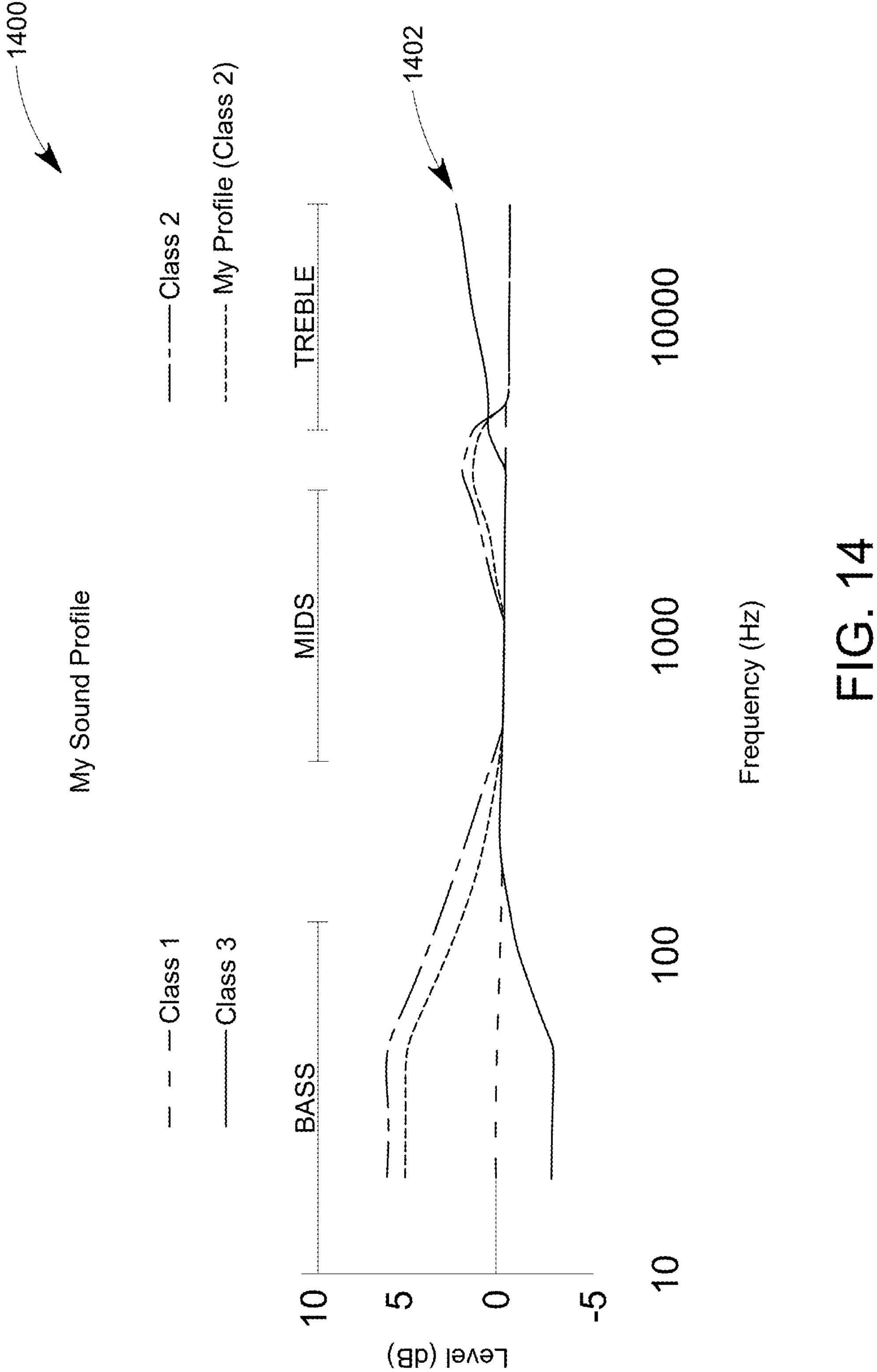
FIG. 14 is a graph illustrating a personal sound profile in accordance with one or more embodiments.

With the EQ process 900, a personal sound profile 1400 as shown in FIG. 14 can be generated. For example, after EQ adjustment is made, the user's sound profile 1400 can be calculated and classified according to which class and percentile the user falls into based on a large sample of listeners as illustrated by the curves 1402.

In one or more examples, the databases 1300 store a user's personalization data for a particular model of headphone. However, it should be noted that the personal sound profile 1400 can be applied to any headphone model where the frequency response of the headphone is known. This is accomplished because the personal sound profile 1400 is applied after the normalized levels are calculated from the error correction/difference frequency response in one or more examples, which can be calculated for any headphone where the frequency response is known.

Figure 15:
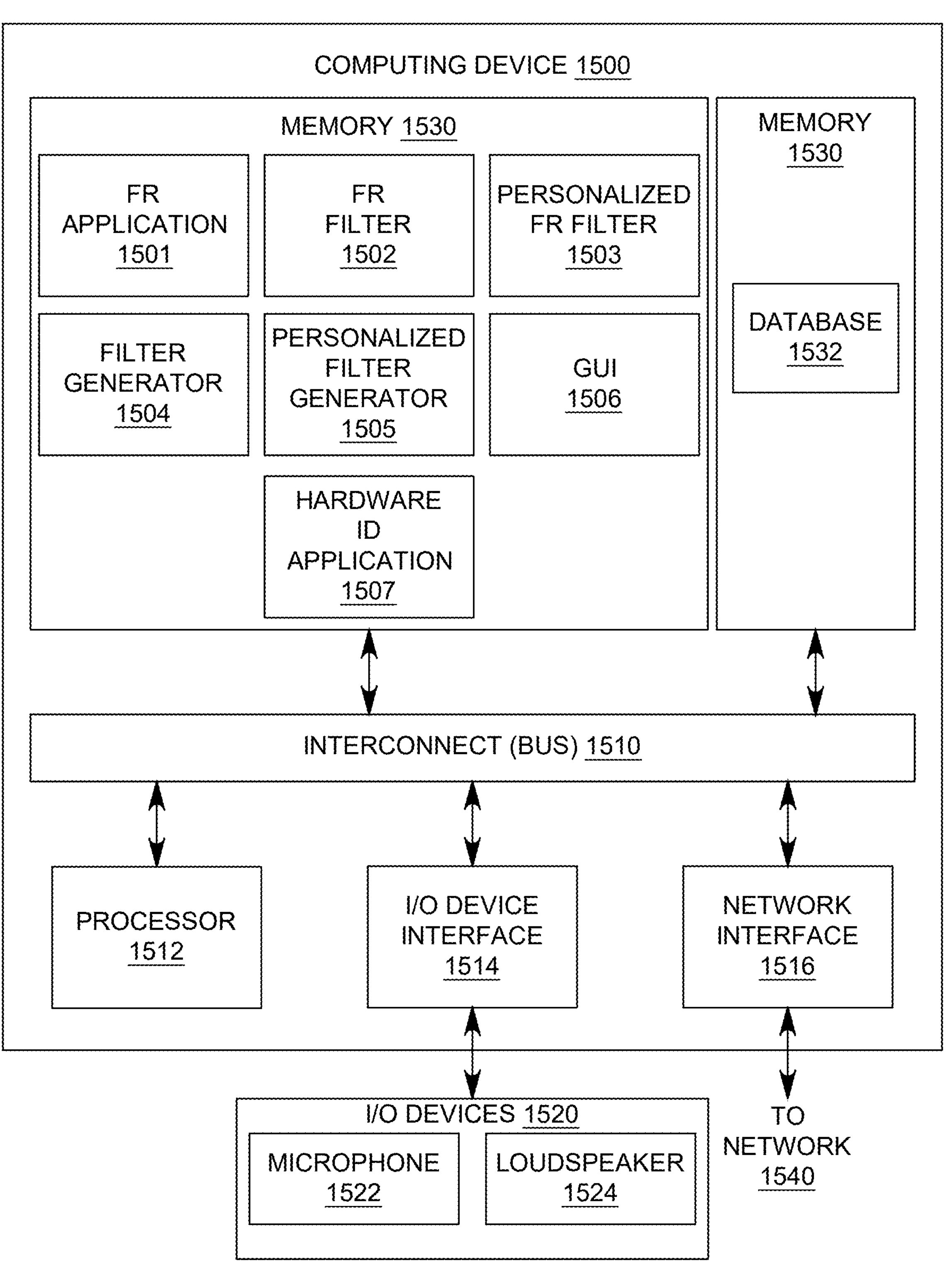
FIG. 15 is a block diagram of a computing device in accordance with one or more embodiments.

One or more examples can be implemented with a computing device 1500 as shown in FIG. 15. The computing device 1500 may be any type of device capable of executing application programs including, without limitation, instructions associated with an FR application 1501, an FR filter 1502, a personalized FR filter 1503, a filter generator 1504, a personalized filter generator 1505, a GUI 1506, and/or a hardware identification (ID) application 1507. For example, and without limitation, the computing device 1500 may be an electronic tablet, a smartphone, a laptop computer, an infotainment system incorporated into a vehicle, a home entertainment system, etc. Alternatively, the computing device 1500 may be implemented as a stand-alone chip, such as a microprocessor, or as part of a more comprehensive solution that is implemented as an application-specific integrated circuit (ASIC), a system-on-a-chip (SoC), and so forth. It is noted that the computing device 1500 described herein is illustrative and that any other technically feasible configurations fall within the scope of the present invention.

As shown, the computing device 1500 includes, without limitation, an interconnect (bus) 1510 that connects a processor 1512, an input/output (I/O) device interface 1514 coupled to I/O devices 1520, memory 1530, and a network interface 1516. The processor 1512 may be any suitable processor implemented as a central processing unit (CPU), an application-specific integrated circuit (ASIC), a field programmable gate array (FPGA), any other type of processing unit, or a combination of different processing units, such as a CPU configured to operate in conjunction with a digital signal processor (DSP). For example, in one or more embodiments, processor 1512 includes a CPU and a DSP. In general, the processor 1512 may be any technically feasible hardware unit capable of processing data and/or executing instructions to facilitate operation of computing device 1500 of FIG. 15, as described herein. Further, in the context of this disclosure, the computing elements shown in computing device 1500 may correspond to a physical computing system (e.g., a system in a data center) or may be a virtual computing instance executing within a computing cloud.

The I/O devices 1520 may include devices capable of providing input, such as a keyboard, a mouse, a touch-sensitive screen, a microphone 1522 and so forth, as well as devices capable of providing output, such as any type of audio playback device including a loudspeaker 1524 (of a headphone) and a display screen. The display screen may be a computer monitor, a video display screen, a display apparatus incorporated into a handheld device, or any other technically feasible display screen. Particular instances of the loudspeaker 1524 can include one or more loudspeakers that are elements of an audio system.

The I/O devices 1520 may include additional devices capable of both receiving input and providing output, such as a touchscreen, a universal serial bus (USB) port, and so forth. Such I/O devices 1520 may be configured to receive various types of input from an end-user of computing device 1500, and also to provide various types of output to the end-user of computing device 1500, such as displayed digital images (e.g., user interfaces or virtual user interface elements). In one or more embodiments, one or more of I/O devices 1520 are configured to couple computing device 1500 to a communication network 1540.

The I/O interface 1514 enables communication of the I/O devices 1520 with the processor 1512. The I/O interface 1514 generally includes logic for interpreting addresses corresponding to I/O devices 1520 that are generated by processor 1512. The I/O interface 1514 may also be configured to implement handshaking between processor 1512 and the I/O devices 1520, and/or generate interrupts associated with I/O devices 1520. The I/O interface 1514 may be implemented as any technically feasible CPU, ASIC, FPGA, any other type of processing unit or device.

The network interface 1516 is a computer hardware component that connects processor 1512 to the communication network 1540. The network interface 1516 may be implemented in the computing device 1500 as a stand-alone card, processor, or other hardware device. In one or more embodiments in which the communication network 1540 includes a WiFi network or a WPAN, the network interface 1516 includes a suitable wireless transceiver. Alternatively or additionally, the network interface 1516 may be configured with cellular communication capability, satellite telephone communication capability, a wireless WAN communication capability, or other types of communication capabilities that allow for communication with the communication network 1540 and other computing devices external to the computing device 1500.

The memory 1530 may include a random access memory (RAM) module, a flash memory unit, or any other type of memory unit or combination thereof. The processor 1512, the I/O device interface 1514, and the network interface 1516 are configured to read data from and write data to the memory 1530. The memory 1530 includes various software programs that can be executed by the processor 1512 and the application data associated with the software programs, including the FR application 1501, FR filter 1502, personalized FR filter 1503, filter generator 1504, personalized filter generator 1505 and/or GUI 1506, and/or hardware ID application 1507.

The memory 1530 can include a non-transitory computer-readable medium, such as a non-volatile storage device. In one or more embodiments, the memory 1530 includes a database 1532 of frequency response curves of various headphone, loudspeakers, or other devices, as well as other data as described in more detail herein. Additionally or alternatively, in one or more embodiments, the database 1532 includes filter response pre-sets, device-specific FR filters, and the like, such as the personal sound profile 1400. Alternatively, in one or more embodiments, the database 1532 can reside remotely from the computing device 1500, for example in a cloud-computing environment having the databases 1300.

The FR application 1501 is configured to implement one or more aspects of one or more embodiments described herein. For example, in one or more embodiments, the FR application 1501 enables an audio system to generate audio output having different FRs. Further, in one or more embodiments, the FR application 501 enables a user to modify audio output generated by the audio system (e.g., headphone) to match the personalized sound profile 1400. In one or more embodiments, the functionality of one or more of the FR filter 1502, personalized FR filter 1503, filter generator 1504, personalized filter generator 1505, GUI 1506, and/or hardware ID application 1507 may be incorporated in the FR application 1501.

The FR filter 1502 is configured to modify an audio input signal according to a certain frequency response curve, such as bass, midrange, and treble as described in more detail herein. For example, in one or more embodiments, the FR filter 1502 is a user-specific FR filter configured to modify an audio input based on user personalization. Alternatively, in one or more embodiments, a frequency response of the FR filter 1502 is selected so that an audio input signal that is processed by the FR filter 1502 and is played back by a specific audio system and results in an audio output that approximates an audio output that is generated by an audio system having a target frequency response curve.

The personalized FR filter 1503 is configured to modify an audio input signal according to a particular user-selected frequency response curve, such as determined by the personal sound profile 1400. In one or more embodiments, the particular frequency response curve is selected by a user as described in more detail herein. For example, the personalized FR filter 1503 can be configured to implement certain equalization parameters that effectively equalize original sound content in a fashion selected by a user. When an audio input signal is processed by the FR filter 1502 and the personalized FR filter 1503 and is then played back by the audio system for which the FR filter 1502 is selected, the resultant audio output generated by the audio system closely approximates an audio output that is generated by an audio system having the user-selected frequency response to curve as described in more detail herein.

Based on the foregoing, the following provides a general overview of the present disclosure and is not a comprehensive summary. In a first one or more embodiments A1, a computer-implemented method comprises calculating percentile values for normalized gains in each of a plurality of equalizer bands, wherein the normalized gains are based on statistical norms for a distribution of gain values for each band of the plurality of equalizer bands; receiving a user input adjusting a gain value for at least one band of the plurality of equalizer bands, wherein the user input is received from a graphical user interface showing adjustment values as the percentile values; adjusting an audio output of an audio playback device based on the received user input; and causing the audio playback device to play the adjusted audio output.

In a second one or more embodiments A2, which may include the first one or more embodiments A1, the plurality of equalizer bands comprises a bass band, a midrange band, and a treble band, and further comprising determining normalized levels for the bass band, the midrange band, and the treble band by calculating an average level in a frequency response error curve for each of the bass band, the midrange band, and the treble band and having a corresponding filter. In a third one or more embodiments A3, which may include the one or more embodiments A1-A2, the audio playback device comprises headphones and further comprising calculating a difference or error in a frequency response between two headphones to generate the frequency response error curve. In a fourth one or more embodiments A4, which may include the one or more embodiments A1-A3, the graphical user interface comprises a virtual control corresponding to each of the bass band, the midrange band, and the treble band, wherein the virtual control is configured to allow adjustment of the gain values that are displayed as the percentile values.

In a fifth one or more embodiments A5, which may include the one or more embodiments A1-A4, the virtual control comprises three virtual rotary controls or three virtual sliding members corresponding to each of the bass band, the midrange band, and the treble band, wherein the virtual control is color coded with different colors to denote where the gain falls within the distribution of statistical norms. In a sixth one or more embodiments A6, which may include the one or more embodiments A1-A5, further comprises storing personalization data for a user to a database, wherein the personalization data defines a personal sound profile for the user and comprises gain settings, a headphone model, a frequency response, a program, a playback SPL, a demographic/hearing profile, or a combination thereof. In a seventh one or more embodiments A7, which may include the one or more embodiments A1-A6, further comprises automatically personalizing the gain value for plurality of equalizer bands based on a model generated by machine learning and configured to predict the personal sound profile for the user based on a personality profile, a demographic profile, a hearing profile, or a combination thereof. In an eighth one or more embodiments A8, which may include the one or more embodiments A1-A7, further comprises calculating and classifying the personal sound profile according to a class and a percentile corresponding to the adjusted gain received from the user.

In a ninth one or more embodiments A9, which may include the one or more embodiments A1-A8, further comprises calculating values for the normalized gains in each band of the plurality of equalizer bands as percentiles relative to a reference frequency response curve. In a tenth one or more embodiments A10, which may include the one or more embodiments A1-A9, the audio playback device comprises headphones and calculating the percentile values for normalized gains in each of a plurality of equalizer bands comprises normalizing a frequency response of the headphones using a reference frequency response and determining mean values for each band of the plurality of equalizer bands using the normalized frequency response. In an eleventh one or more embodiments A11, which may include the one or more embodiments A1-A10, wherein receiving the user input adjusting the gain value for at least one band of the plurality of equalizer bands comprises receiving one or more adjustments corresponding to a standard test track.

In a twelfth one or more embodiments A12, which may include the one or more embodiments A1-A11, further comprising displaying via the graphical user interface a normalized gain value for each band of the plurality of equalizer bands before receiving the user input. In a thirteenth one or more embodiments A13, which may include the one or more embodiments A1-A12, wherein the statistical norms are updated based on preferred settings for a plurality of listeners.

In a fourteenth one or more embodiments A14, which may include the one or more embodiments A1-A13, a system comprises an audio playback device; a graphical user interface; a processor; and a non-transitory computer-readable storage medium storing instructions which, when executed by the processor, cause the processor to: calculate percentile values for normalized gains in each of a plurality of equalizer bands, wherein the normalized gains are based on statistical norms for a distribution of gain values for each band of the plurality of equalizer bands; receive a user input adjusting a gain value for at least one band of the plurality of equalizer bands, wherein the user input is received from the graphical user interface showing adjustment values as the percentile values; adjust an audio output of the audio playback device based on the received user input; and cause the audio playback device to play the adjusted audio output.

In a fifteenth one or more embodiments A15, which may include the one or more embodiments A1-A14, wherein the audio playback device comprises headphones and the plurality of equalizer bands comprises a bass band, a midrange band, and a treble band, and the instructions further cause the processor to determine normalized levels for the bass band, the midrange band, and the treble band by calculating an average level in a frequency response error curve for each of the bass band, the midrange band, and the treble band and having a corresponding filter, and calculate a difference or error in a frequency response between the headphones and another set of headphones to generate the frequency response error curve. In a sixteenth one or more embodiments A16, which may include the one or more embodiments A1-A15, wherein the graphical user interface comprises a virtual control corresponding to each of the bass band, the midrange band, and the treble band, wherein the virtual control is configured to allow adjustment of the gain values that are displayed as the percentile values, wherein the virtual control comprises three virtual rotary controls or three virtual sliding members corresponding to each of the bass band, the midrange band, and the treble band, and wherein the virtual control is color coded with different colors to denote where the gain falls within the distribution of statistical norms.

In a seventeenth one or more embodiments A17, which may include the one or more embodiments A1-A16, wherein the instructions further cause the processor to store personalization data for a user to a database, wherein the personalization data defines a personal sound profile for the user and comprises gain settings, a headphone model, a frequency response, a program, a playback SPL, a demographic/hearing profile, or a combination thereof, and wherein the personal sound profile is calculated and classified according to a class and a percentile corresponding to the adjusted gain received from the user. In an eighteenth one or more embodiments A18, which may include the one or more embodiments A1-A17, wherein the audio playback device comprises headphones and the instructions further cause the processor to calculate the percentile values for normalized gains in each of a plurality of equalizer bands normalizing a frequency response of the headphones using a reference frequency response and determine mean values for each band of the plurality of equalizer bands using the normalized frequency response. In a nineteenth one or more embodiments A19, which may include the one or more embodiments A1-A18, wherein the graphical user interface is configured to display a normalized gain value for each band of the plurality of equalizer bands before receiving the user input.

In a twentieth one or more embodiments 20, which may include the one or more embodiments A1-A19, one or more non-transitory computer-readable media storing processor-executable instructions that, when executed by at least one processor, cause the at least one processor to: calculate percentile values for normalized gains in each of a plurality of equalizer bands, wherein the normalized gains are based on statistical norms for a distribution of gain values for each band of the plurality of equalizer bands; receive a user input adjusting a gain value for at least one band of the plurality of equalizer bands, wherein the user input is received from a graphical user interface showing adjustment values as the percentile values; adjust an audio output of an audio playback device based on the received user input; and cause the audio playback device to play the adjusted audio output.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

Although described in connection with the processor 214, examples of the disclosure are capable of implementation with numerous other general-purpose or special-purpose computing system environments, configurations, or devices.

Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A computer-implemented method, comprising:
- calculating percentile values for normalized gains in each of a plurality of equalizer bands, wherein the normalized gains are based on statistical norms for a distribution of gain values for each band of the plurality of equalizer bands;
- receiving a user input adjusting a gain value for at least one band of the plurality of equalizer bands, wherein the user input is received from a graphical user interface showing adjustment values as the percentile values;
- adjusting an audio output of an audio playback device based on the received user input; and
- causing the audio playback device to play the adjusted audio output.

2. The computer-implemented method of claim 1, wherein the plurality of equalizer bands comprises a bass band, a midrange band, and a treble band, and further comprising determining normalized levels for the bass band, the midrange band, and the treble band by calculating an average level in a frequency response error curve for each of the bass band, the midrange band, and the treble band and having a corresponding filter.

3. The computer-implemented method of claim 2, wherein the audio playback device comprises headphones and further comprising calculating a difference or error in a frequency response between two headphones to generate the frequency response error curve.

4. The computer-implemented method of claim 2, wherein the graphical user interface comprises a virtual control corresponding to each of the bass band, the midrange band, and the treble band, wherein the virtual control is configured to allow adjustment of the gain values that are displayed as the percentile values.

5. The computer-implemented method of claim 4, wherein the virtual control comprises three virtual rotary controls or three virtual sliding members corresponding to each of the bass band, the midrange band, and the treble band, wherein the virtual control is color coded with different colors to denote where the gain falls within the distribution of statistical norms.

6. The computer-implemented method of claim 1, further comprising storing personalization data for a user to a database, wherein the personalization data defines a personal sound profile for the user and comprises gain settings, a headphone model, a frequency response, a program, a playback SPL, a demographic/hearing profile, or a combination thereof.

7. The computer-implemented method of claim 6, further comprising automatically personalizing the gain value for plurality of equalizer bands based on a model generated by machine learning and configured to predict the personal sound profile for the user based on a personality profile, a demographic profile, a hearing profile, or a combination thereof.

8. The computer-implemented method of claim 6, further comprising calculating and classifying the personal sound profile according to a class and a percentile corresponding to the adjusted gain received from the user.

9. The computer-implemented method of claim 1, further comprising calculating values for the normalized gains in each band of the plurality of equalizer bands as percentiles relative to a reference frequency response curve.

10. The computer-implemented method of claim 1, wherein the audio playback device comprises headphones and calculating the percentile values for normalized gains in each of a plurality of equalizer bands comprises normalizing a frequency response of the headphones using a reference frequency response and determining mean values for each band of the plurality of equalizer bands using the normalized frequency response.

11. The computer-implemented method of claim 1, wherein receiving the user input adjusting the gain value for at least one band of the plurality of equalizer bands comprises receiving one or more adjustments corresponding to a standard test track.

12. The computer-implemented method of claim 1, further comprising displaying via the graphical user interface a normalized gain value for each band of the plurality of equalizer bands before receiving the user input.

13. The computer-implemented method of claim 1, wherein the statistical norms are updated based on preferred settings for a plurality of listeners.

14. A system, comprising:
- an audio playback device;
- a graphical user interface;
- a processor; and
- a non-transitory computer-readable storage medium storing instructions which, when executed by the processor, cause the processor to:
- calculate percentile values for normalized gains in each of a plurality of equalizer bands, wherein the normalized gains are based on statistical norms for a distribution of gain values for each band of the plurality of equalizer bands;
- receive a user input adjusting a gain value for at least one band of the plurality of equalizer bands, wherein the user input is received from the graphical user interface showing adjustment values as the percentile values;
- adjust an audio output of the audio playback device based on the received user input; and
- cause the audio playback device to play the adjusted audio output.

15. The system of claim 14, wherein the audio playback device comprises headphones and the plurality of equalizer bands comprises a bass band, a midrange band, and a treble band, and the instructions further cause the processor to determine normalized levels for the bass band, the midrange band, and the treble band by calculating an average level in a frequency response error curve for each of the bass band, the midrange band, and the treble band and having a corresponding filter, and calculate a difference or error in a frequency response between the headphones and another set of headphones to generate the frequency response error curve.

16. The system of claim 15, wherein the graphical user interface comprises a virtual control corresponding to each of the bass band, the midrange band, and the treble band, wherein the virtual control is configured to allow adjustment of the gain values that are displayed as the percentile values, wherein the virtual control comprises three virtual rotary controls or three virtual sliding members corresponding to each of the bass band, the midrange band, and the treble band, and wherein the virtual control is color coded with different colors to denote where the gain falls within the distribution of statistical norms.

17. The system of claim 14, wherein the instructions further cause the processor to store personalization data for a user to a database, wherein the personalization data defines a personal sound profile for the user and comprises gain settings, a headphone model, a frequency response, a program, a playback SPL, a demographic/hearing profile, or a combination thereof, and wherein the personal sound profile is calculated and classified according to a class and a percentile corresponding to the adjusted gain received from the user.

18. The system of claim 14, wherein the audio playback device comprises headphones and the instructions further cause the processor to calculate the percentile values for normalized gains in each of a plurality of equalizer bands normalizing a frequency response of the headphones using a reference frequency response and determine mean values for each band of the plurality of equalizer bands using the normalized frequency response.

19. The system of claim 14, wherein the graphical user interface is configured to display a normalized gain value for each band of the plurality of equalizer bands before receiving the user input.

20. One or more non-transitory computer-readable media storing processor-executable instructions that, when executed by at least one processor, cause the at least one processor to:

calculate percentile values for normalized gains in each of a plurality of equalizer bands, wherein the normalized gains are based on statistical norms for a distribution of gain values for each band of the plurality of equalizer bands;

receive a user input adjusting a gain value for at least one band of the plurality of equalizer bands, wherein the user input is received from a graphical user interface showing adjustment values as the percentile values;

adjust an audio output of an audio playback device based on the received user input; and cause the audio playback device to play the adjusted audio output.

* * * * *